UNITED STATES PATENT OFFICE.

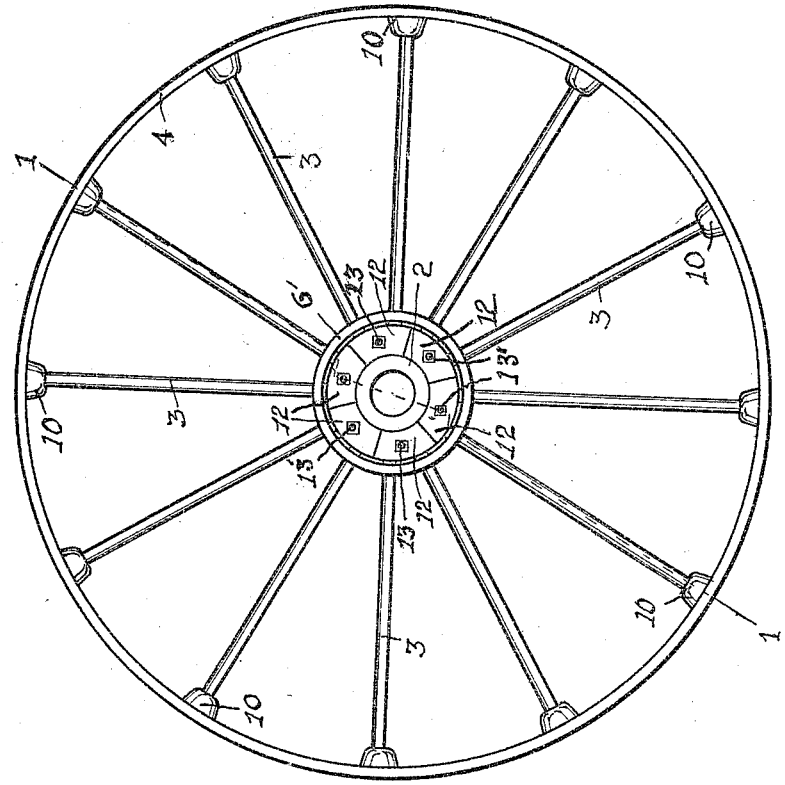

ABNER D. BAKER, OF SWANTON, OHIO.

METAL WHEEL FOR STEAM AND GAS TRACTORS.

1,296,904. Specification of Letters Patent. Patented Mar. 11, 1919.

Application filed September 24, 1917. Serial No. 192,869.

*To all whom it may concern:*

Be it known that I, ABNER D. BAKER, a citizen of the United States, residing at Swanton, in the county of Fulton and State of Ohio, have invented new and useful Improvements in Metal Wheels for Steam and Gas Tractors, of which the following is a specification.

My invention relates to improvements in metal wheels for steam and gas tractors and the like, and has for its object to overcome the difficulties experienced in metal wheels arising from the spokes becoming loosened. In metal wheels built on the compression principle the spokes become loosened by compression of the metal of the spoke, or the expansion of the rim.

The object of my invention is to provide a wheel of such construction that any looseness of the spoke or spokes arising from the shortening of the spoke by compression, or by the expansion of the rim can be quickly and conveniently adjusted so as to take up such looseness and tighten the spoke and true the wheel.

I accomplish these objects by the construction and combination of parts as hereinafter described and illustrated in the drawings, in which—

Figure 1 is a view in side elevation of a wheel constructed in accordance with my invention, and Fig. 2 is a diametric section of the same on line 1—1 of Fig. 1.

In the drawings 2 designates the hub, 3 the spokes and 4 the rim of a wheel constructed in accordance with my invention.

The hub 2 is a cylinder with its central portion 3 of increased diameter and proportionately increased bore, having integral therewith flush with the shoulders formed by the reduced end portions 5, annular flanges 6 having cylindrical portions 6' angled parallel with the end portions 5 from the base flanges 6 and forming annular recesses 7 between the end portions 5 and the cylindrical portions 6' of the flanges 6.

The cylindrical portions 6' of the flanges 6, and the rim 4 are each provided at regular intervals with an equal even number of radial spoke holes 8, the holes being in radial pairs, one in each flange 6', in the same radial longitudinal plane of the hub, and with the axes of the holes of each pair converging at angles of about 85 degrees from the outer faces of the flanges 6'.

The rim 4 is provided with holes 9 of increased diameter in axial alinement with each hole 8 of the flanges 6' of the hub and through each rim hole 9 a spoke 3 is inserted inward to and through the alined hole 8 of the hub flange 6', until the inner end of the spoke is against the main body of the hub. Upon the outer end of each spoke is mounted a spoke holder 10 having a cylindrical portion 10' adapted to freely but not loosely enter the holes 9, and having an enlarged hemispheroidal head portion 11 provided with a spoke socket 11' adapted to closely but freely receive the outer end of a spoke.

The annular recesses 7 of the hub 2 are each provided with one half as many wedge blocks 12 as there are spoke-ends in each flange 6'. Each block 12 is an equal segment of an annular ring equal to the space of the annular recess 7 except that the outer face of each segment is cut away from its outer end toward the inner end at an angle of about five degrees, whereby the vertical face of the wedge is at a right angle to the axis of the spoke 3, when the wedge is inserted between the hub and the inner end of the spoke.

The wedge blocks 12 are each provided centrally of their width with a longitudinal bolt hole and opposite thereto the flanges 6 are each provided with a bolt bore adapted to register with the wedge bolt bore, and when the wedge is inserted in a recess 7, a bolt 13 is inserted outwardly through the bore of the flange 6 and into the bore of the wedge.

When the wedges are in place in the recesses 7, they engage the inner ends of the spokes. The horizontal inward movement of the wedges radially projects the spokes and the members 10 into operative engagement with the holes 9 in the rim. When the wedge 12 is forced inwardly until the end of a bolt 13 projects through the wedge, a nut 13' is run on the bolt and tightened thereon against the wedge with a wrench, whereby the spokes are tightened between the hub and the rim and all of the spokes of the two flanges being so wedged outward and secured, it is manifest that any spoke that has become loosened, whether by being shortened by compression, or by reason of the expansion of the rim, may be readily tightened by forcing the wedge farther inward by the nut 13'.

Thus constructed the parts of the wheel are readily assembled and firmly secured together with equal compression of the rim and the spoke on the hub, and any inequality or looseness arising thereafter from use is as readily corrected.

What I claim to be new is—

1. A vehicle wheel comprising a rim, a hub, spokes disposed in radial pairs, said hub having at each end an outwardly opening annular recess through the surrounding walls of which the inner ends of the spokes loosely project, for each radial pair of spokes a segmental wedge conforming to the circle of said recesses and against which wedges the inner ends of the spokes abut in pairs, and means for the independent horizontal adjustment of said segments.

2. In a tractor wheel, the combination of a hub having cylindrical end portions, each provided with a cup flange having an annular base portion radial to the hub and a cylindrical body portion concentric to the end portion of the hub, and forming therewith an annular cylindriform end recess between the end portion and the flange, said flanges being each provided with an equal number of spoke holes arranged at regular radial intervals of their periphery, and in converging pairs, in the same longitudinal radial plane of the hub, one hole of each pair in each flange, a rim having a plurality of pairs of spoke holes, one of each pair opposite and radially alined with a spoke hole of the end flanges, a plurality of pairs of spokes, each spoke comprising a main elongated cylindrical member adapted to be inserted through a rim hole into an alined hole of the hub flange, with its inner end against the periphery of an end portion of the hub, and an outer end member having an enlarged inner end portion provided with a socket to receive the outer end of the main spoke member, and a reduced cylindrical outer end portion adapted to enter a spoke hole of the rim alined therewith, when mounted on the outer end of the main spoke member, and to be moved radially outward therewith into a spoke hole of the rim, and a plurality of wedges for each end recess, each wedge having an inner face adapted to conform to a segment of the periphery of an end portion of the hub, and an outer face inclined from the outer end of the wedge to the inner end and adapted to be inserted in the recess between a spoke and an end portion of the hub, each wedge and the base portion of the adjacent flange being respectively provided with alined registering bolt holes, a bolt extending longitudinally through each wedge and through the base portion of the adjacent flange, and a nut for each bolt adapted to be run thereon against the wedge.

In testimony whereof I have hereunto set my hand this 17th day of September, 1917, at Toledo, Ohio.

ABNER D. BAKER.